(12) United States Patent
Holzmann et al.

(10) Patent No.: US 10,507,419 B2
(45) Date of Patent: Dec. 17, 2019

(54) CLEANABLE FILTER

(71) Applicant: Cummins Filtration IP, Inc., Columbus, IN (US)

(72) Inventors: Mark V. Holzmann, Stoughton, WI (US); Robert A. Bannister, Stoughton, WI (US); Budi Antony, Fitchburg, WI (US); Scott W. Schwartz, Cottage Grove, WI (US); Brian W. Schwandt, Fort Atkinson, WI (US); Steven R. Sankbeil, Stoughton, WI (US); Christopher E. Holm, Madison, WI (US); Eric A. Janikowski, Jefferson, WI (US); Scott G. Manke, Sun Prairie, WI (US)

(73) Assignee: Cummins Filtration IP, Inc., Columbus, IN (US)

( * ) Notice: Subject to any disclaimer, the term of this patent is extended or adjusted under 35 U.S.C. 154(b) by 746 days.

(21) Appl. No.: 14/758,065

(22) PCT Filed: Jan. 10, 2014

(86) PCT No.: PCT/US2014/011020
§ 371 (c)(1),
(2) Date: Jun. 26, 2015

(87) PCT Pub. No.: WO2014/110354
PCT Pub. Date: Jul. 17, 2014

(65) Prior Publication Data
US 2015/0343361 A1     Dec. 3, 2015

Related U.S. Application Data

(60) Provisional application No. 61/752,208, filed on Jan. 14, 2013.

(51) Int. Cl.
*B01D 33/073* (2006.01)
*B01D 33/39* (2006.01)
(Continued)

(52) U.S. Cl.
CPC ..... *B01D 46/0067* (2013.01); *B01D 46/0068* (2013.01); *B01D 46/0071* (2013.01);
(Continued)

(58) Field of Classification Search
CPC .... B01D 33/073; B01D 33/275; B01D 33/39; B01D 33/50; B01D 33/54; B01D 33/56;
(Continued)

(56) References Cited

U.S. PATENT DOCUMENTS 2,901,770 A    9/1959   Beck
3,272,337 A    9/1966   Elwell
(Continued)

FOREIGN PATENT DOCUMENTS

EP    0 323 701    7/1989
EP    0 442 365    8/1991
(Continued)

OTHER PUBLICATIONS

International Search Report and Written Opinion Issued for PCT/US2014/011020, dated Jul. 11, 2014, 11 pages.
(Continued)

*Primary Examiner* — Minh Chau T Pham
(74) *Attorney, Agent, or Firm* — Foley & Lardner LLP

(57) ABSTRACT

Cleanable filters and methods of cleaning filters are described in the present application. The cleanable air filter includes a housing and a filter element installed in the housing. The filter element is configured to filter an operating fluid in a given application. The filter element is cleanable in-situ in the installed condition in the housing. The cleanable air filter further includes a cleaning fluid
(Continued)

applicator configured to apply a cleaning fluid to the filter element while the filter element is in the installed condition in the housing such that the filter element is cleanable without being removed from the filter housing.

16 Claims, 13 Drawing Sheets

(51) Int. Cl.
    B01D 33/50    (2006.01)
    B01D 33/54    (2006.01)
    B01D 33/56    (2006.01)
    B01D 46/00    (2006.01)
    F02M 35/08    (2006.01)
    F24F 3/16    (2006.01)

(52) U.S. Cl.
    CPC ..... *B01D 46/0075* (2013.01); *B01D 46/0079* (2013.01); *B01D 46/0082* (2013.01); *F02M 35/086* (2013.01); *F24F 3/1603* (2013.01); *F24F 2003/1639* (2013.01)

(58) Field of Classification Search
    CPC .......... B01D 2201/085; B01D 46/0067; B01D 46/0068; B01D 46/0082; B01D 46/0071; B01D 46/0079; F02M 35/086; F24F 2003/1639
    USPC .... 210/106, 798, 323.2, 408, 406, 425, 411, 210/321.89, 388, 500.23, 321.74, 321.6, 210/407, 107; 55/283, 284, 289, 290, 55/293, 294, 302; 95/273, 280
    See application file for complete search history.

(56) References Cited

U.S. PATENT DOCUMENTS

| | | | |
|---|---|---|---|
| 3,357,560 A | 12/1967 | Raupp | |
| 3,429,108 A * | 2/1969 | Larson | B01D 46/24 137/850 |
| 4,130,404 A * | 12/1978 | Bergdahl | B01D 46/26 55/291 |
| 4,222,755 A * | 9/1980 | Grotto | B01D 46/26 55/291 |
| 4,299,245 A * | 11/1981 | Clapper | B01D 41/04 118/318 |
| 4,388,091 A * | 6/1983 | Khosropour | B01D 46/2411 55/337 |
| 4,632,755 A | 12/1986 | Degraffenried | |
| 4,732,678 A | 3/1988 | Humbert, Jr. | |
| 4,853,118 A | 8/1989 | Brownell et al. | |
| 4,882,055 A | 11/1989 | Stamstad | |
| 4,976,852 A | 12/1990 | Janik et al. | |
| 5,017,285 A | 5/1991 | Janik et al. | |
| 5,024,761 A | 6/1991 | Deibel | |
| 5,084,170 A | 1/1992 | Janik et al. | |
| 5,116,499 A | 5/1992 | Deibel | |
| 5,118,417 A | 6/1992 | Deibel | |
| 5,128,043 A | 7/1992 | Wildermuth | |
| 5,236,579 A | 8/1993 | Janik et al. | |
| 5,312,546 A | 5/1994 | Janik | |
| 5,433,927 A | 7/1995 | Mausgrover et al. | |
| 5,470,468 A | 11/1995 | Colby | |
| 5,536,153 A | 7/1996 | Edwards | |
| 5,584,900 A * | 12/1996 | Zaiser | B01D 41/04 55/293 |
| 5,667,682 A | 9/1997 | Laird | |
| 5,695,636 A | 12/1997 | Gullett | |
| 5,809,786 A | 9/1998 | Scudder et al. | |
| 5,855,780 A | 1/1999 | Dye et al. | |
| 5,880,466 A | 3/1999 | Benner | |
| 5,922,092 A * | 7/1999 | Taylor | B01D 45/12 55/295 |
| 6,113,781 A | 9/2000 | Popoff et al. | |
| 6,156,213 A * | 12/2000 | Dudley | B01D 41/04 134/138 |
| 6,171,482 B1 | 1/2001 | Nichols | |
| 6,264,831 B1 | 7/2001 | Hawkins et al. | |
| 6,325,929 B1 | 12/2001 | Bassett | |
| 6,379,610 B1 | 4/2002 | Kemp | |
| 6,511,637 B2 * | 1/2003 | Bundy | B01D 46/02 422/169 |
| 6,554,140 B2 | 4/2003 | Steger et al. | |
| 6,569,218 B2 * | 5/2003 | Dudley | A47L 9/20 15/352 |
| 6,571,962 B2 | 6/2003 | Thomas | |
| 6,616,735 B1 | 9/2003 | Burban et al. | |
| 6,666,909 B1 | 12/2003 | Tegrotenhuis et al. | |
| 6,773,521 B2 | 8/2004 | Kemp | |
| 6,840,386 B2 | 1/2005 | Steger et al. | |
| 6,861,004 B2 * | 3/2005 | Benenson, Jr. | B01D 29/15 210/785 |
| 6,869,462 B2 | 3/2005 | Tegrotenhuis et al. | |
| 6,874,641 B2 * | 4/2005 | Clary | B01D 29/21 134/138 |
| 6,913,786 B2 | 7/2005 | Proulx et al. | |
| 7,014,761 B2 | 3/2006 | Merritt et al. | |
| 7,066,452 B2 | 6/2006 | Rotering et al. | |
| 7,153,422 B2 | 12/2006 | Herman et al. | |
| 7,156,991 B2 | 1/2007 | Herman et al. | |
| 7,168,573 B2 | 1/2007 | Brown et al. | |
| 7,179,380 B2 | 2/2007 | Merritt et al. | |
| 7,182,864 B2 | 2/2007 | Brown et al. | |
| 7,247,245 B1 | 7/2007 | Proulx et al. | |
| 7,282,086 B2 * | 10/2007 | Stuckey | B01D 41/04 134/153 |
| 7,297,256 B2 | 11/2007 | Loftis et al. | |
| 7,311,208 B2 | 12/2007 | Brown et al. | |
| 7,361,271 B2 | 4/2008 | Merritt et al. | |
| 7,390,403 B2 | 6/2008 | Siwak | |
| 7,459,084 B2 | 12/2008 | Baig et al. | |
| 7,513,996 B2 | 4/2009 | Kloos et al. | |
| 7,540,475 B2 | 6/2009 | Stenkamp et al. | |
| 7,614,504 B2 | 11/2009 | South et al. | |
| 7,651,554 B2 | 1/2010 | Tan et al. | |
| 7,673,756 B2 | 3/2010 | Levy et al. | |
| 7,740,678 B2 | 6/2010 | Gunderson et al. | |
| 7,771,596 B2 | 8/2010 | McKenzie et al. | |
| 7,828,970 B2 | 11/2010 | Kloos et al. | |
| 7,828,971 B2 | 11/2010 | Kloos et al. | |
| RE42,059 E | 1/2011 | Jiang | |
| 7,862,710 B2 | 1/2011 | Kloos et al. | |
| 7,867,387 B2 | 1/2011 | Jiang et al. | |
| 7,955,500 B2 | 6/2011 | Abdalla et al. | |
| 8,052,865 B2 | 11/2011 | Kloos et al. | |
| 8,114,299 B2 | 2/2012 | Verdegan et al. | |
| 8,146,751 B2 | 4/2012 | Hawkins et al. | |
| 8,147,693 B2 | 4/2012 | Terry et al. | |
| 8,157,897 B2 * | 4/2012 | Meister | B01D 41/02 55/283 |
| 8,167,966 B2 | 5/2012 | Amirkhanian et al. | |
| 8,216,980 B2 | 7/2012 | Clarkin et al. | |
| 8,220,640 B2 | 7/2012 | Schmitz et al. | |
| 8,231,793 B2 | 7/2012 | Hacker et al. | |
| 8,236,177 B1 | 8/2012 | Wood | |
| 8,262,762 B2 | 9/2012 | Olson et al. | |
| 8,262,910 B2 | 9/2012 | Kloos et al. | |
| 9,108,135 B2 | 8/2015 | Gillingham et al. | |
| 2001/0004061 A1 | 6/2001 | Popoff et al. | |
| 2003/0000874 A1 | 1/2003 | Proulx et al. | |
| 2003/0189002 A1 | 10/2003 | Proulx et al. | |
| 2004/0011730 A1 | 1/2004 | Powell et al. | |
| 2004/0025485 A1 | 2/2004 | Lee | |
| 2004/0200771 A1 | 10/2004 | Proulx et al. | |
| 2004/0238445 A1 | 12/2004 | McLaughlin et al. | |
| 2005/0077227 A1 | 4/2005 | Kirker et al. | |
| 2005/0229563 A1 | 10/2005 | Holzmann et al. | |
| 2005/0282060 A1 | 12/2005 | Defillippis et al. | |
| 2006/0138031 A1 | 6/2006 | Kloos et al. | |
| 2007/0007898 A1 | 1/2007 | Bruning | |
| 2007/0131604 A1 | 6/2007 | Nomura | |
| 2007/0144716 A1 | 6/2007 | Doh et al. | |

(56) References Cited

U.S. PATENT DOCUMENTS

| | | |
|---|---|---|
| 2007/0193929 A1 | 8/2007 | Brown et al. |
| 2007/0193936 A1 | 8/2007 | Almasian et al. |
| 2008/0047885 A1* | 2/2008 | Shiekelmacher ...... B01D 29/23 210/107 |
| 2008/0179263 A1 | 7/2008 | Wieczorek et al. |
| 2009/0001004 A1 | 1/2009 | McCormick et al. |
| 2009/0014381 A1 | 1/2009 | South et al. |
| 2009/0050554 A1 | 2/2009 | Shaam |
| 2009/0057219 A1 | 3/2009 | Bagci et al. |
| 2009/0132291 A1 | 5/2009 | Schmitt |
| 2009/0211959 A1 | 8/2009 | Clint |
| 2009/0321339 A1 | 12/2009 | Suzuki et al. |
| 2010/0129080 A1 | 5/2010 | Saniee et al. |
| 2010/0140155 A1 | 6/2010 | Gift et al. |
| 2010/0200490 A1 | 8/2010 | Martin et al. |
| 2010/0243554 A1 | 9/2010 | Herrin et al. |
| 2011/0011042 A1* | 1/2011 | Gillingham ........ B01D 46/0068 55/302 |
| 2011/0024344 A1 | 2/2011 | Thomas et al. |
| 2011/0073538 A1 | 3/2011 | Jiang et al. |
| 2011/0132828 A1 | 6/2011 | Ries et al. |
| 2011/0132829 A1 | 6/2011 | Tucker et al. |
| 2011/0203099 A1 | 8/2011 | Curt et al. |
| 2011/0252974 A1 | 10/2011 | Verdegan et al. |
| 2011/0309011 A1 | 12/2011 | Kloos et al. |
| 2012/0004304 A1 | 1/2012 | Yun |
| 2012/0055887 A1 | 3/2012 | Love |
| 2012/0080372 A1 | 4/2012 | Ries et al. |
| 2012/0132290 A1 | 5/2012 | Tonkovich et al. |
| 2013/0206008 A1* | 8/2013 | Szczap ............... B01D 46/0068 95/280 |
| 2013/0327213 A1* | 12/2013 | Boatwright, Jr. .. B01D 46/0068 95/10 |
| 2015/0027311 A1* | 1/2015 | Link .................. B01D 46/0068 95/279 |
| 2015/0176545 A1* | 6/2015 | Troxell ................ F02M 35/086 55/302 |
| 2016/0038867 A1* | 2/2016 | Kim .................. B01D 19/0057 55/428 |
| 2017/0252691 A1* | 9/2017 | Johnson ............... B01D 46/002 |

FOREIGN PATENT DOCUMENTS

| | | |
|---|---|---|
| EP | 0 529 782 | 3/1993 |
| EP | 0 593 434 | 4/1994 |
| EP | 0 657 198 | 6/1995 |
| EP | 0 662 337 | 7/1995 |
| EP | 0 678 477 | 10/1995 |
| EP | 0 718 021 | 6/1996 |
| EP | 1 196 229 | 4/2002 |
| EP | 1 409 118 | 4/2004 |
| EP | 1 779 913 | 5/2007 |
| EP | 1 896 369 | 3/2008 |
| EP | 2 266 679 | 12/2010 |
| EP | 2 471 586 | 7/2012 |
| GB | 2194285 | 3/1988 |
| GB | 2223691 | 4/1992 |
| WO | WO-93/11074 | 6/1993 |
| WO | WO-96/31269 | 10/1996 |
| WO | WO-00/34183 | 6/2000 |
| WO | WO-02/38243 | 5/2002 |
| WO | WO-02/089947 | 11/2002 |
| WO | WO-02/089948 | 11/2002 |
| WO | WO-2006/138677 | 12/2006 |
| WO | WO-2007/007898 | 1/2007 |
| WO | WO-2007/075862 | 7/2007 |
| WO | WO-2009/067188 | 5/2009 |
| WO | WO-2009/132291 | 10/2009 |
| WO | WO-2009/149186 | 12/2009 |
| WO | WO-2010/006259 | 1/2010 |
| WO | WO-2010/104491 | 9/2010 |
| WO | WO-2010/129080 | 11/2010 |
| WO | WO-2011/066498 | 6/2011 |
| WO | WO-2012/004304 | 1/2012 |
| WO | WO-2012/054542 | 4/2012 |
| WO | WO-2012/132290 | 10/2012 |
| WO | WO-2014/126715 | 8/2014 |
| WO | WO-2014/133686 | 9/2014 |
| WO | WO-2014/133947 | 9/2014 |
| WO | WO-2014/134273 | 9/2014 |
| WO | WO-2014/137518 | 9/2014 |
| WO | WO-2014/137917 | 9/2014 |
| WO | WO-2014/143851 | 9/2014 |
| WO | WO-2014/149289 | 9/2014 |

OTHER PUBLICATIONS

"Implementation Manual of Water Regulations and Standards" (Book II), China Water & Power Press, www.waterpub.com.cn, 2006, 7 pages including translation.

Second Chinese Office Action with translation issued for Chinese Patent Application No. 201480003998.9, dated Nov. 9, 2016, 11 pages.

* cited by examiner

CLEANABLE FILTER

CROSS REFERENCE TO RELATED APPLICATIONS

This application is a National Stage of PCT Application No. PCT/US2014/011020, filed Jan. 10, 2014, which claims priority to U.S. Provisional Patent Application Ser. No. 61/752,208, entitled "CLEANABLE FILTER," which was filed Jan. 14, 2013. These applications are hereby incorporated by reference in their entirety and for all purposes.

TECHNICAL FIELD

The present invention relates to air filtration systems. More particularly, the present application relates to cleanable filter elements for air filtration systems.

BACKGROUND

Air filtration systems typically filter particulate (e.g., dust and other contaminants) out of dirty air (e.g., from an external environment) to provide clean air to a system. For example, an automotive air intake system typically includes an air filtration system configured to filter dirty air from the external environment prior to providing the air to a combustion chamber of the engine. The filtration may be performed by an air filter element within the filtration system. The air filter element may include air filter media. The air filter media may be supported in the air filter element by a frame. The air filter media is configured to trap the particulate contained in the dirty air as the air flows through the air filter media.

As dirty air is filtered through the air filter media, the air filter media loads as particulate builds within the air filter media and on the surface of the air filter media. As the load of the air filter media increases, the efficiency of the air filter typically increases. Additionally, as the load of the air filter media increases, the restriction of air flow through the air filter media typically increases. At a certain point in the air filter's life, the restriction through the air filter media becomes too large for the air filtration system to function properly. At or before this point, the air filter element, including the air filter media, is typically replaced with a new or refurbished air filter element.

The consistent need to replace filter elements within filtration systems has associated drawbacks. A first drawback is the cost of regularly replacing the filter elements. Replacement filter elements may be expensive. Additionally, the labor costs of technicians can drive up the operating costs of the filtration systems. A second drawback is negative environmental impact associated with the disposal of used filter elements in landfills. A third drawback is the potential contamination of the filtration systems that may occur when the old filter elements are removed. For example, a seal may be broken within the air filtration system when the old air filter element is removed, and prior to installation of the new air filter element, dirty air may travel to the clean side of the air filtration system. The above drawbacks are driving owners and operators of filtration systems to request self-cleaning filtration systems, thereby eliminating the need to replace the filter elements at regular service intervals.

SUMMARY

One exemplary embodiment relates to a cleanable air filter. The cleanable air filter includes a housing and a filter element installed in the housing. The filter element is configured to filter an operating fluid in a given application. The filter element is cleanable in-situ in the installed condition in the housing. The cleanable air filter further includes a cleaning fluid applicator configured to apply a cleaning fluid to the filter element while the filter element is in the installed condition in the housing such that the filter element is cleanable without being removed from the filter housing.

Another exemplary embodiment relates to a method for cleaning a filter element having an installed condition in a filter housing and filtering fluid in a given application. The method includes applying, by a controller, cleaning fluid to the filter element while the filter element is in the installed condition in the filter housing, wherein the cleaning fluid frees particulate from the filter element. The method further includes ejecting, by the controller, the freed particulate from the filter housing.

Yet another exemplary embodiment relates to a method of cleaning a filter installed in a system. The method includes receiving, at a controller, a cleaning command. The method further includes applying, through a fluid inlet, a cleaning fluid to a filter element of the filter. The method includes activating, by the controller, a vibration mechanism configured to vibrate the filter element. The method further includes ejecting, through an opening in a housing of the filter, particulate freed from the filter element during the applying of the cleaning fluid and the activation of the vibration mechanism.

These and other features, together with the organization and manner of operation thereof, will become apparent from the following detailed description when taken in conjunction with the accompanying drawings.

DETAILED DESCRIPTION OF THE VARIOUS EMBODIMENTS

Referring to the figures generally, the various embodiments disclosed herein relate to a cleanable filter elements within an filter system. The cleanable filter elements are cleanable without requiring removal from the filter systems. A pressurized air supply may be coupled to the filter systems. Air from the pressurized air supply may be used to "blow out" or "blow off" captured and caked on particulate (e.g., dust) from the filter media of the filter element. Air from the pressurized air supply may drive a vibration mechanism that vibrates the filter element thereby assisting in dislodging captured and caked on particulate from the filter media of the filter element. A vacuum may assist in evacuating any dislodged particulate from the region surrounding the filter media. The evacuated particulate may be ejected into the outside environment.

Figure 1:
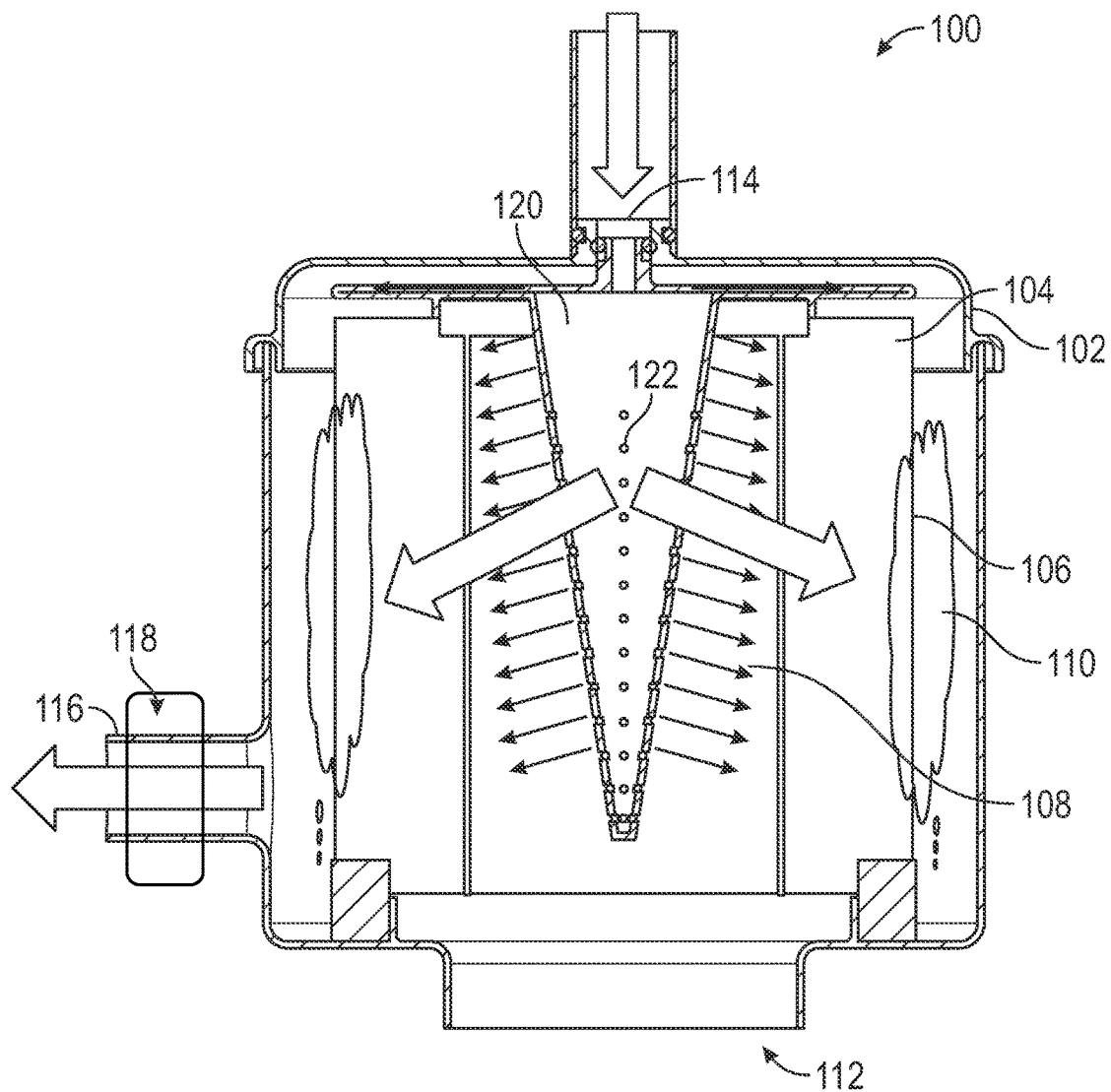
FIG. 1 is a cross-sectional view of cleanable air filter according to an exemplary embodiment.

Referring to FIG. 1, a cross-sectional view of a cleanable air filter 100 is shown according to an exemplary embodiment. The air filter 100 includes a housing 102 and filter media 104. The filter media 104 is arranged in a cylindrical manner within the housing 102. The air filter 100 is configured to filter particulate out of dirty air (e.g., from an external environment) to provide clean air to another system (e.g., an internal combustion engine system, a compressor system, a medical system, a heating, ventilation and air conditioning (HVAC) system, etc.). Filtering is performed by the filter media 104. As shown in FIG. 1, the filter media 104 is in an installed position within the housing 102. The filter media 104 may be removable from the filter housing 102.

As shown in FIG. 1, the filter media 104 includes a dirty side 106 and a clean side 108. The dirty side 106 receives dirty air from the external environment. The air then passes through the filter media 104 and out the clean side 108. As the air passes from the dirty side 106 to the clean side 108, the filter media captures particulate 110 contained in the air from the external environment. The clean air may then be passed out of the opening 112 to the system that receives the clean air (e.g., an internal combustion engine). A first seal may be positioned between the filter media 104 and the opening 112 to isolate the dirty side 106 from the clean side 108. A second seal may be positioned between the filter media 104 and the housing 102 (e.g., at the top of the housing opposite the opening 112) to isolate the dirty side 106 from the clean side 108. The second seal may be spaced apart from the first seal.

As the filter media 104 collects particulate 110, the particulate 110 builds within the filter media 104 and on the surface of the filter media 104. As the amount of built up particulate 110 increases, the efficiency of the air filter 100 increases. Additionally, the amount of built up particulate 110 increases, the restriction of air flow through the air filter 100 increases. At a certain point in the life of the filter media 104, the restriction becomes too large for the filter media 104 to function properly. Accordingly, air filter 100 includes a pressurized air input 114 that supplies clean, pressurized air to blow the particulate 110 out of and off of the filter media 106.

The pressurized air input 114 may be connected to a pressurized air source. The air from the pressurized air source may have already been filtered through the air filter 100 (e.g., stored in a pressurized take after a prior filtering operation). During a cleaning operation, the air from the pressurized air source may flow through the pressurized air input 114 and into the air filter 100. The air may be supplied to the clean side 108 of the filter media 104. Accordingly, clean air passes into the filter media 104 through the clean side 108, continues through the filter media 104, and passes out of the filter media 104 through the dirty side 106. In the process, the air sweeps particulate 110 out of the filter media 104 and off of the dirty side 106 of the filter media. The freed particulate 110 may then pass out of the filter housing 102 through an ejection port 116. The ejection portion 116 may include a check valve 118 that prevents air and particulate 110 from flowing out of the housing 102 when cleaning operations are not being performed. The check valve 118 may be selectively opened and closed during a cleaning operation or during a filter operation. The ejection port 116 may eject the now dirtied cleaning air and the particulate 110 to the external environment. In some arrangements, a vacuum source (e.g., a vacuum chamber, a vacuum pump, etc.) may be connected to the ejection port 116 to assist in removing particulate 110 from the filter. The opening 112 may be selectively closed during the cleaning operation (e.g., by operation of a valve) to increase the amount of air flowing from the pressurized air input 114 and out the dust ejection port 116. The air entering the air filter 100 through the pressurized air input 114 may be routed through an air distributor 120. The air distributor 120 may be conical in shape, although other shapes are also possible. The air distributor 120 includes a plurality of openings 122. The openings may be substantially evenly spaced across the air distributor 120 to evenly distribute the air from the pressurized air input across a surface of the clean side 108 of the filter media 104.

The cleaning operation removes particulate 110 from the filter media 104. Accordingly, the lifespan of the filter media 104 may be increased through the cleaning operations. The cleaning operation may be automatically performed (e.g., at regular intervals, based on feedback from a sensor, etc.) or may be performed as an on-demand operation at the instruction of a user. The cleaning operation may be performed while the system connected to the air filter 100 is operating or while the system connected to the air filter 100 is not operating. The cleaning operation does not require the filter 100 to be disassembled or the filter media 104 to be removed or uninstalled from the housing 102. Accordingly, the cleaning operation may be performed in-situ (e.g., with the filter media 104 in the installed condition).

Figure 2:
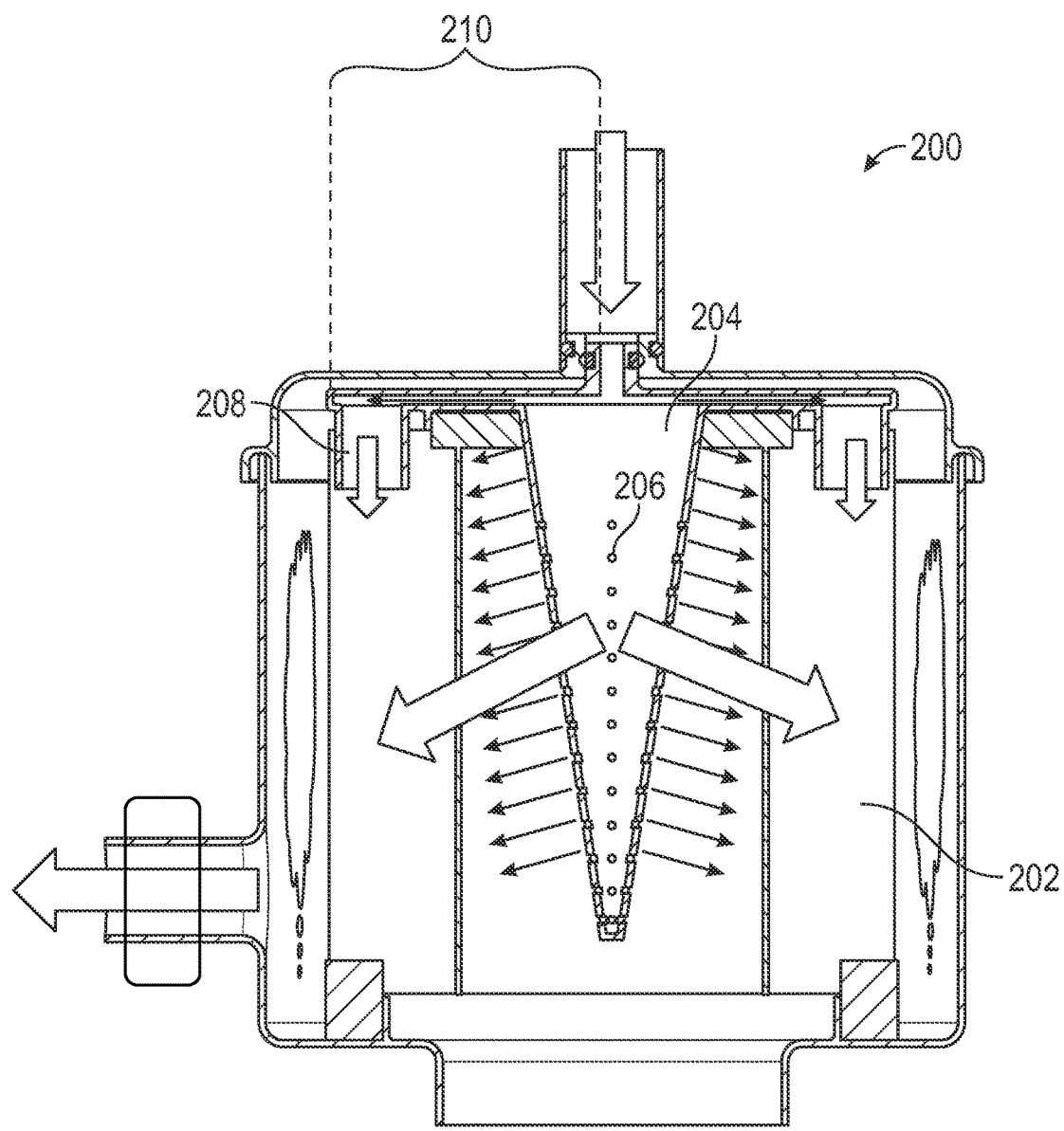
FIG. 2 is a cross-sectional view of a cleanable air filter according to an exemplary embodiment.

Referring to FIG. 2, a cross-sectional view of a cleanable air filter 200 is shown according to another exemplary embodiment. Air filter 200 is substantially similar to air filter 100 in its arrangement of components and function. However, the air filter 200 routes cleaning air through filter media 202 in a slightly different manner. Similar to air filter 100, the air filter 200 includes an air distributor 204. The air distributor 204 may be placed on the clean side of the air filter media 202. The air distributor 204 may be conical in shape, with other shapes also being possible. The air distributor 204 includes a plurality of openings 206. The openings 206 may be substantially evenly spaced across the air distributor 204 to evenly distribute the air from the pressurized air input across a surface of the clean side of the filter media 202. In addition to the air distributor 204, the air filter 200 may route cleaning air directly into the air filter media 202 through an air pipe 208 coupled to the air filter media 202. The air filter 200 may include a plurality of air pipes 208. The air pipe 208 may provide cleaning air into a top end of the air filter media 202. A cleaning air manifold 210 may provide air to both the air pipe 208 and to the air distributor 204.

Figure 3:
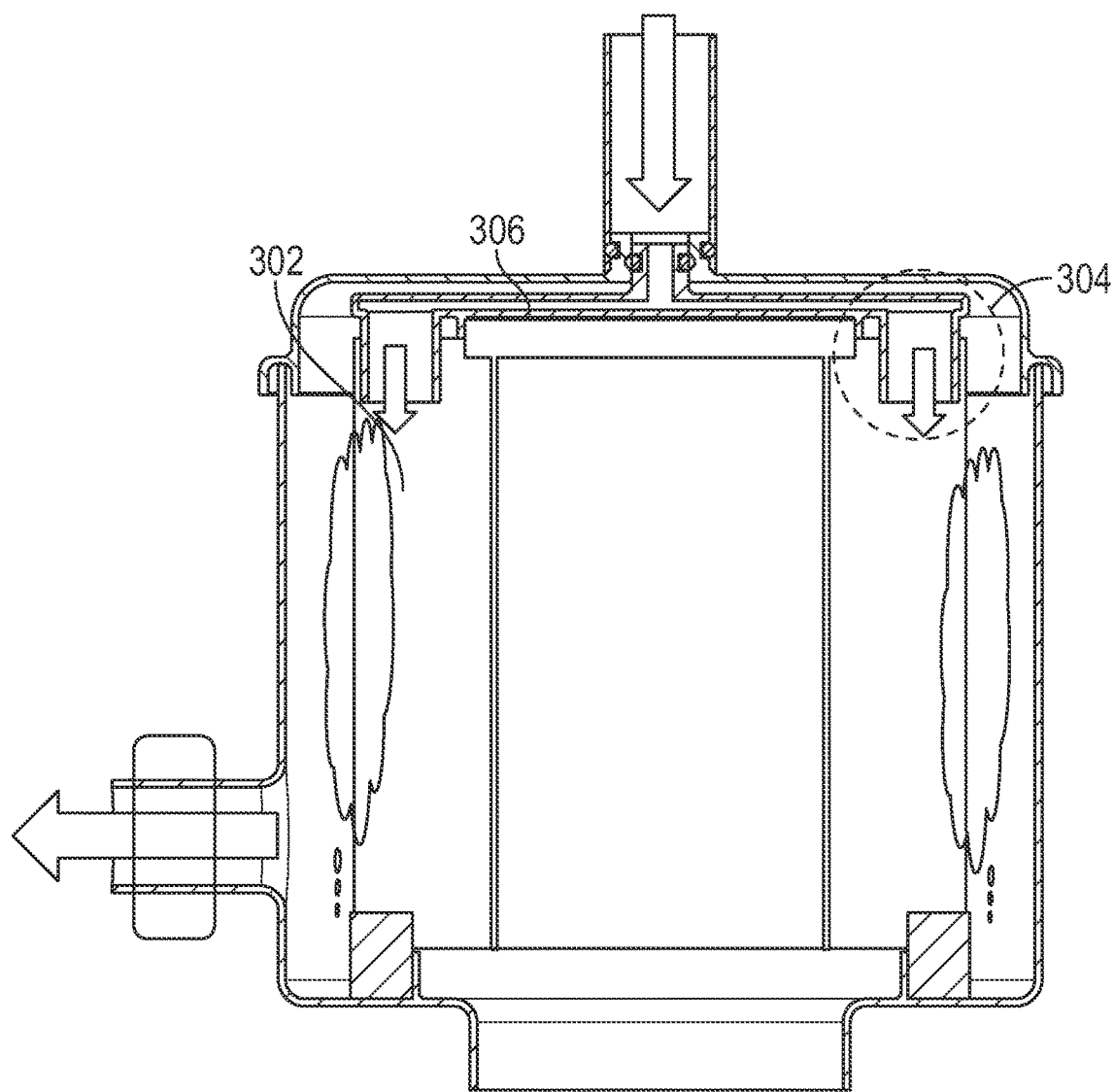
FIG. 3 is a cross-sectional view of a cleanable air filter according to an exemplary embodiment.

Referring to FIG. 3, a cross-sectional view of a cleanable air filter 300 is shown according to yet another exemplary embodiment. Air filter 300 is substantially similar to air filters 100 and 200 in its arrangement of components and function. However, air filter 300 routes cleaning air through filter media 302 in a slightly different manner. Similar to air filter 200, air filter 300 includes an air pipe 304 or a plurality of air pipes 304 to route cleaning air directly into the air filter media 302. The air pipe or pipes 304 may be coupled to the air filter media 302. A cleaning air manifold 306 may provide air to the air pipe or pipes 304. Unlike filters 100 and 200, filter 300 does not include a central air distributor that directs air onto the clean side of the filter media 302.

Figure 4:
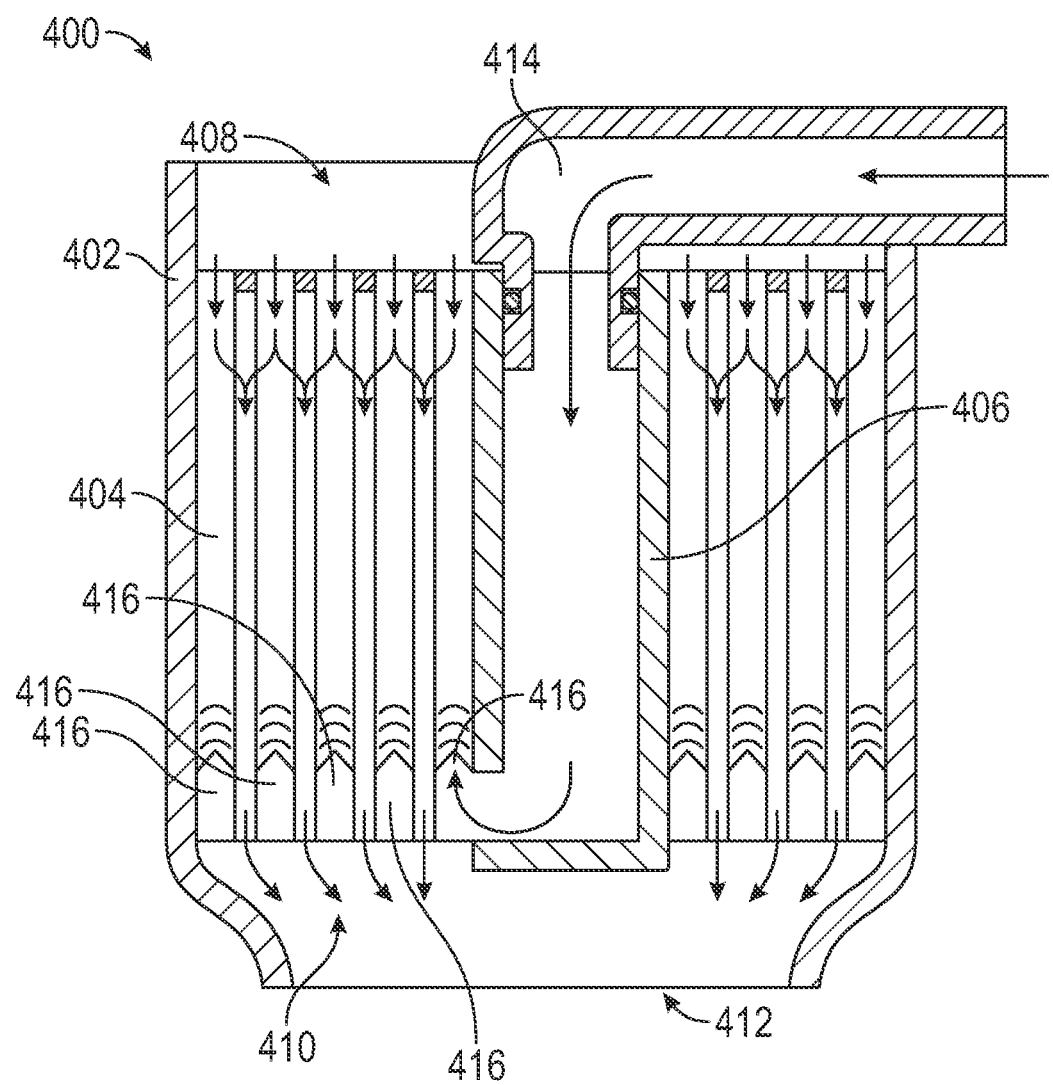
FIG. 4 is a cross-sectional view of a cleanable air filter according to an exemplary embodiment.

Referring to FIG. 4, a cross-sectional view of a cleanable air filter 400 is shown according to still another exemplary embodiment. The air filter 400 includes a housing 402 containing a coiled filter media 404. The coiled filter media 404 may be could around a center tube 406. The coiled filter media 404 may occupy the space between the center tube 406 and the interior of the housing 402. The coiled filter media 404 includes a dirty side 408, in which dirty air containing particulates enters the coiled filter media 404, and a clean side 410, in which clean, filtered air exits the filter media 404. The clean filtered air may exit the air filter through an opening 412 in the housing 402.

Similar to the above discussed air filters, the coiled filter media 404 collects particulate as the air is filtered through the air filter 400. Accordingly, the air filter 400 includes a pressurized air input 414 that supplies clean, pressurized air to blow the particulate out of and off of the coiled filter media 404. The pressurized air input 414 may be connected to a pressurized air source. The air from the pressurized air source may have already been filtered through the air filter 400 (e.g., stored in a pressurized tank after a prior filtering operation). During a cleaning operation, the air from the pressurized air source may flow through the pressurized air input 414, through the center tube 406, and through a coiled hollow tubing 416 into the filter media 404. The hollow tubing 416 may include a plurality of holes located at a tip edge along the length of the hollow tubing 416 to deliver the cleaning air to the dirty side 410 of the filter media 404. The hollow tubing 416 may be extruded. The hollow tubing 416 may be an air sparge plenum. The hollow tubing 416 may provide cleaning air to each coil of the coiled filter media 404. The air provided by the hollow tubing 416 forces captured particulate and caked particulate out of and off of the coiled filter media 404 in a similar manner as described above with respect to air filters 100, 200, and 300. The freed particulate may then pass out of the housing 402 through an ejection port. The ejection portion may include a check valve that prevents air and particulate from flowing out of the housing 402 when cleaning operations are not being performed. The ejection port may eject the now dirtied air and the particulate to the external environment. In some arrangements, a vacuum source (e.g., a vacuum chamber, a vacuum pump, etc.) may be connected to the ejection port to assist in removing particulate from the filter 400.

Figure 5:
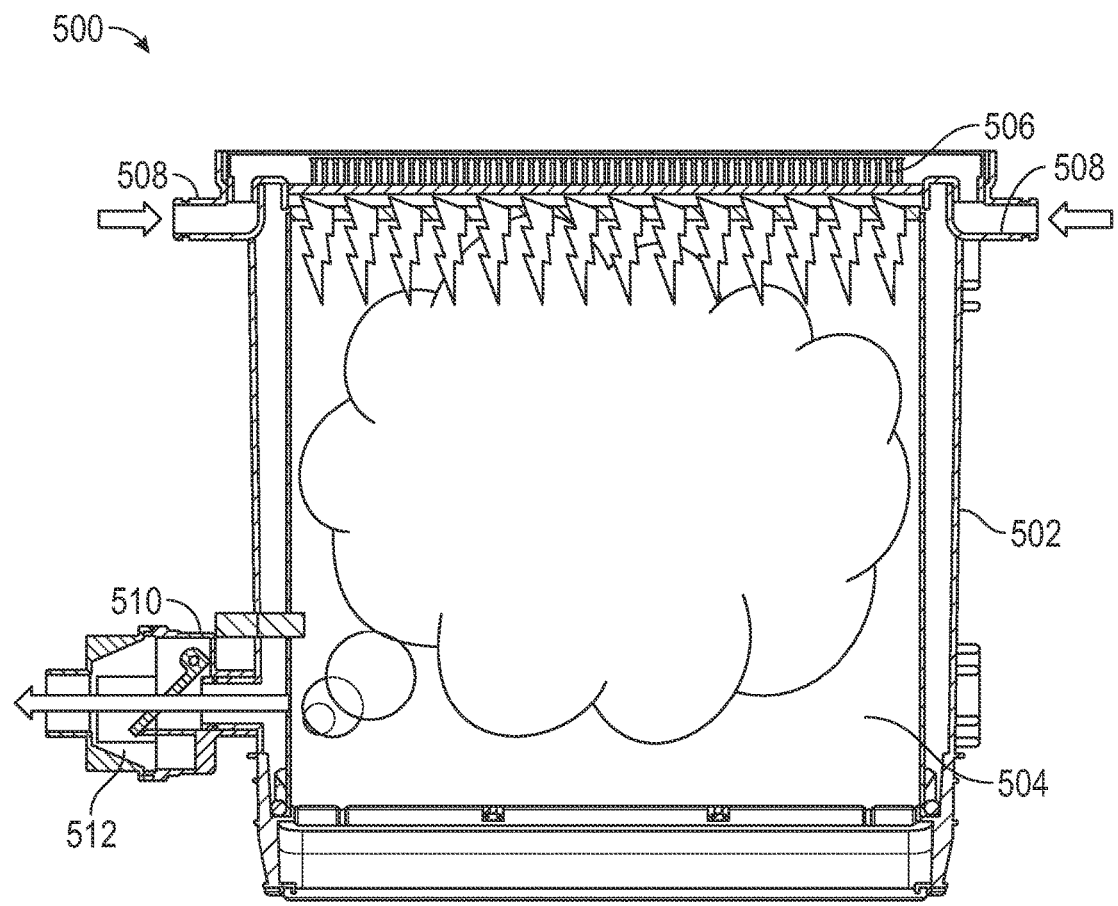
FIG. 5 is a cross-sectional view of a cleanable air filter according to an exemplary embodiment.
Figure 6:
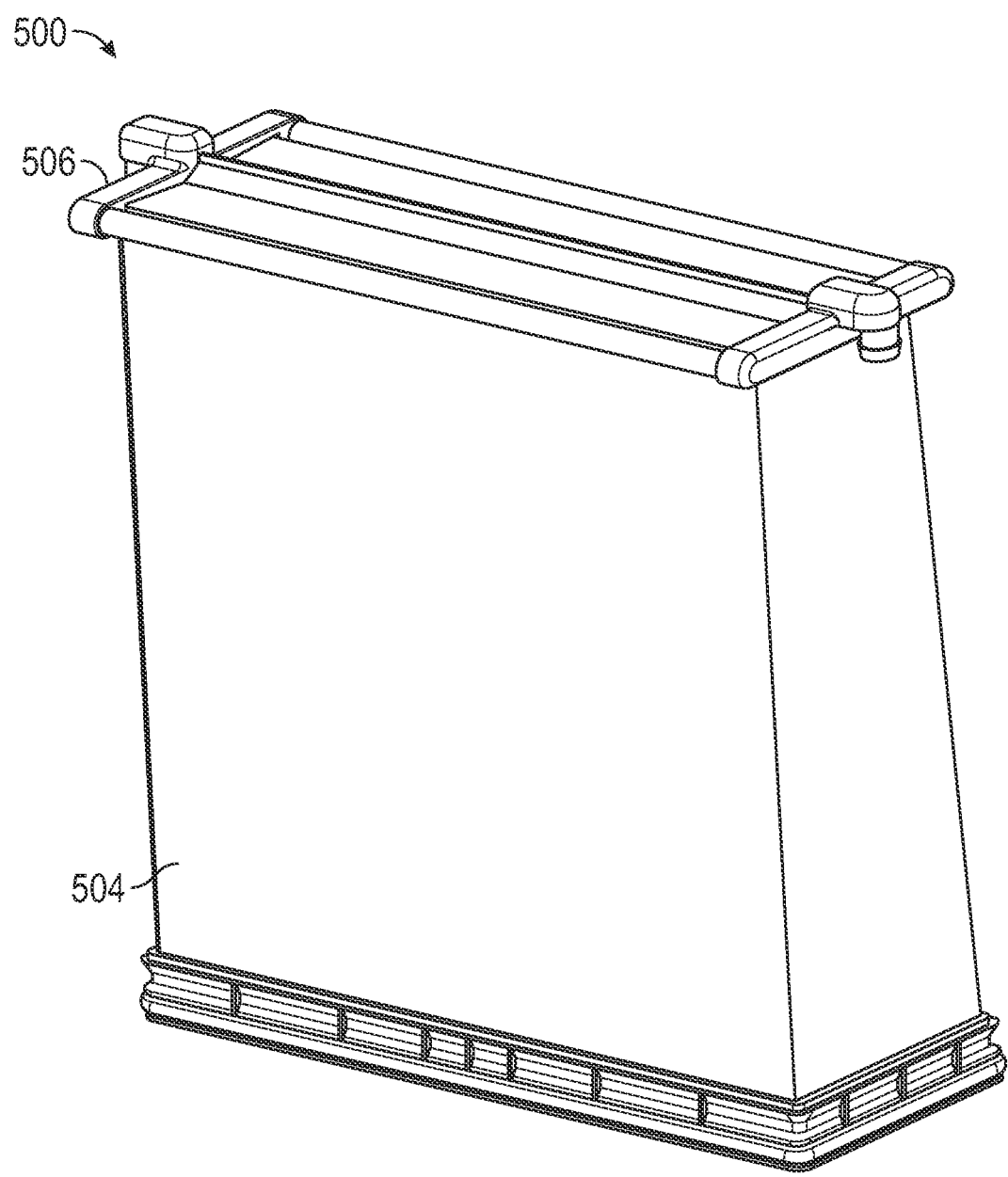
FIG. 6 is a perspective view of the cleanable air filter of FIG. 5 without the housing according to an exemplary embodiment.
Figure 12:
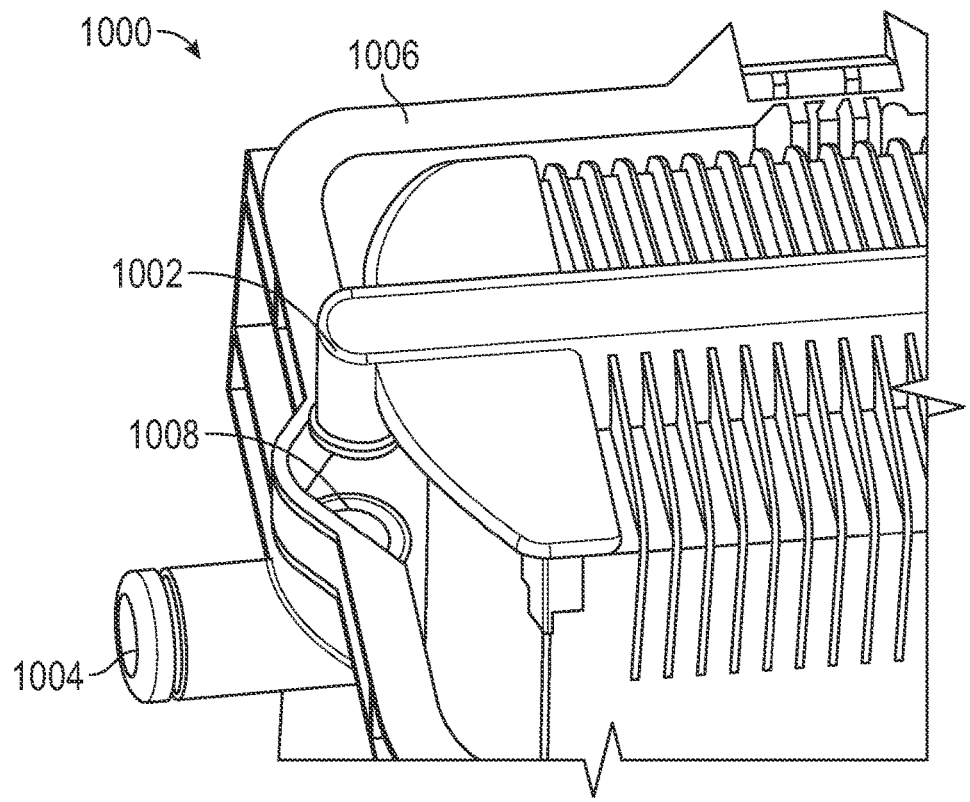

Referring to FIGS. 5 and 6, views of a cleanable air filter 500 are shown according to an exemplary embodiment. FIG. 5 shows a cross-sectional view of the cleanable air filter 500 is shown according to an exemplary embodiment. FIG. 6 shows a perspective view of the air filter 500 without the housing 502. Air filter 500 is similar in both arrangement and operation to cleanable air filters 100, 200, 300, and 400. Air filter 500, however, includes a substantially rectangular housing 502 that contains a V-shaped filter media 504. Additionally, air filter 500 differs in that pressurized cleaning air is routed into a manifold 506 from a pressurized air input 508 such that pressurized air is directed onto a dirty side of the filter media 504 by the manifold 506. The manifold 506 may connect to the housing 502, which includes the pressurized air input 508. A locating feature and an o-ring or auxiliary seal may be used (as shown in FIG. 12) to assist in forming an air-tight connection between the manifold 506 and the pressurized air input 508. The o-ring or auxiliary seal may be provided at an interface between the manifold 506 and the housing 502. In this arrangement, the pressurized cleaning air dislodges particulate built up on the surface of the dirty side of the filter media 504. In some arrangements, the manifold 506 may be configured to provide cleaning air to the dirty side, the clean side, or both sides of the filter media 504. The manifold 506 may include a one-way valve permitting cleaning air to exit the manifold 506 and to prevent fluid flow from the dirty side of the filter media 504 to the clean side of the filter media. The manifold 506 may be a constituent part of the filter media such that when the filter media 504 is removed from the housing 502, the manifold 506 is also removed (e.g., as shown in FIG. 6). The freed particulate may then pass out of the housing 502 through an ejection port 510. The ejection portion 510 may include a check valve 512 that prevents air and particulate from flowing out of the housing 502 when cleaning operations are not being performed. The ejection port 510 may eject the now dirtied air and the particulate to the external environment. In some arrangements, a vacuum source (e.g., a vacuum chamber, a vacuum pump, etc.) may be connected to the ejection port 510 to assist in removing particulate from the filter 500.

Figure 7:
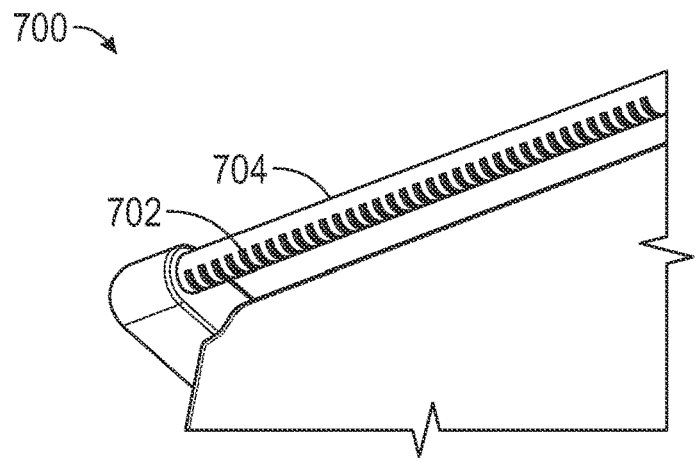
FIGS. 7 through 9 show arrangements of air delivery ports in a manifold according to exemplary embodiments.
Figure 8:
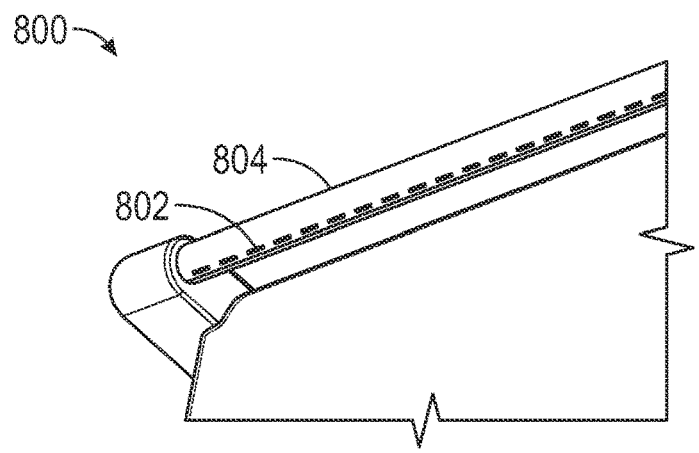
Figure 9:
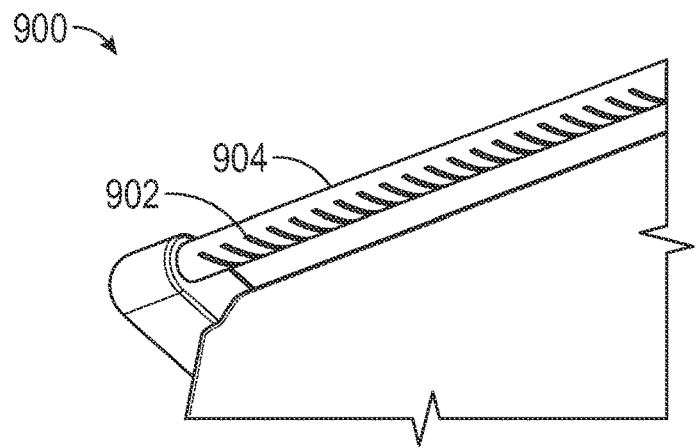

Referring to FIGS. 7 through 9, views of different arrangements of manifold air passage channels (e.g., air delivery ports of manifold 506) are shown. As shown in FIGS. 7-9, the manifold may include a plurality of passage channels. The passage channels direct the cleaning air to various locations along the filter media. As shown in FIG. 7, a first manifold arrangement 700 may include a plurality of passage channels 702 that are substantially perpendicular to the longitudinal axis of a manifold pipe 704. As shown in FIG. 8, a second manifold arrangement 800 may include a plurality of passage channels 802 that are substantially in line with the longitudinal axis of a manifold pipe 804. As shown in FIG. 9, a third manifold arrangement 900 may include a plurality of passage channels 902 that are positioned at a non-perpendicular angle with respect to the longitudinal axis of a manifold pipe 704. Although each of the above described arrangements depict passage channels 702, 802, and 902 as slots, the ports may be sized and shaped in any suitable manner. The passage channels 702, 802, and 902 may be formed by a water-gas assisted injection molding process.

Figure 10:
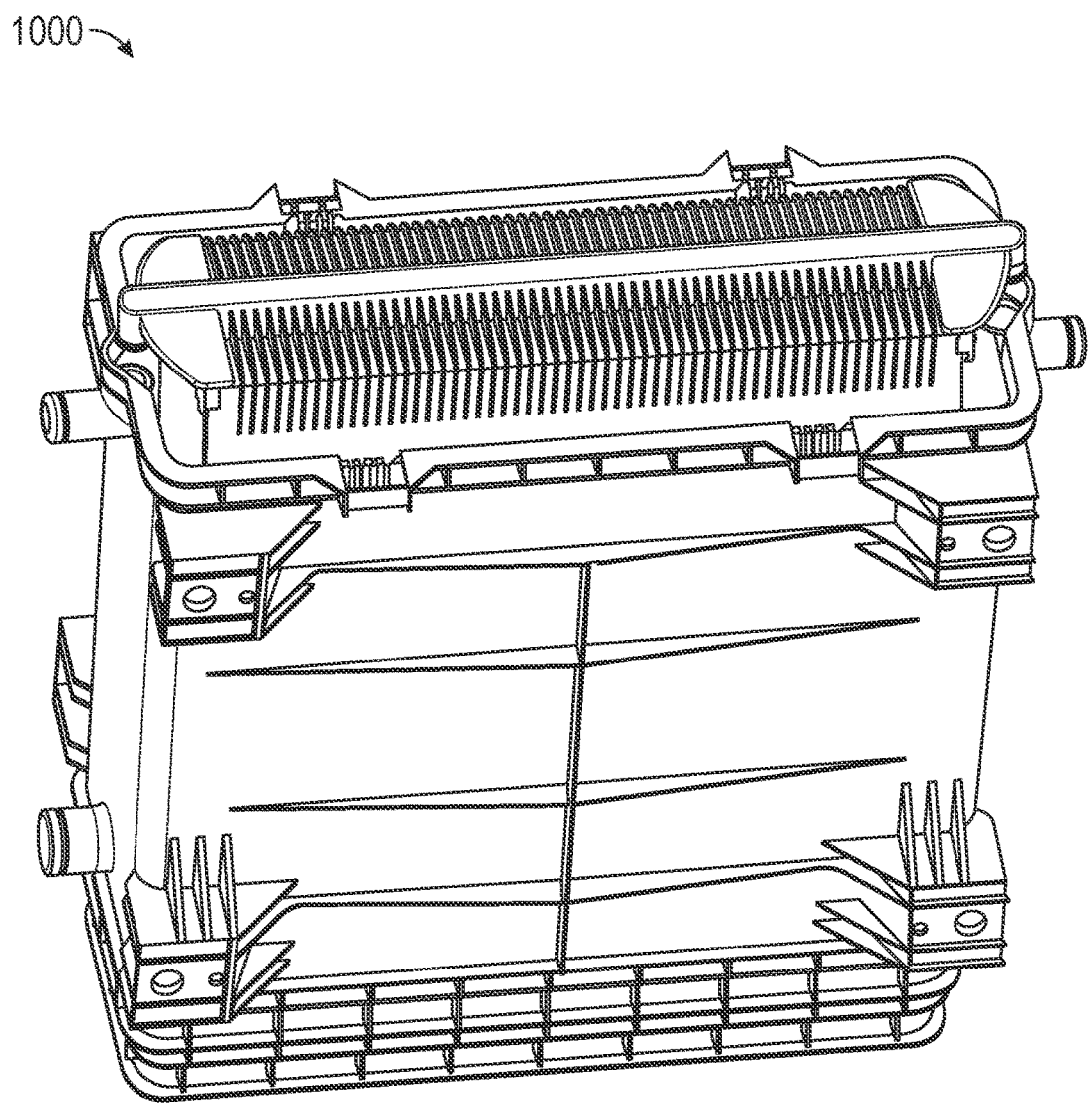
FIGS. 10 through 12 show a cleanable air filter according to an exemplary embodiment.
Figure 11:
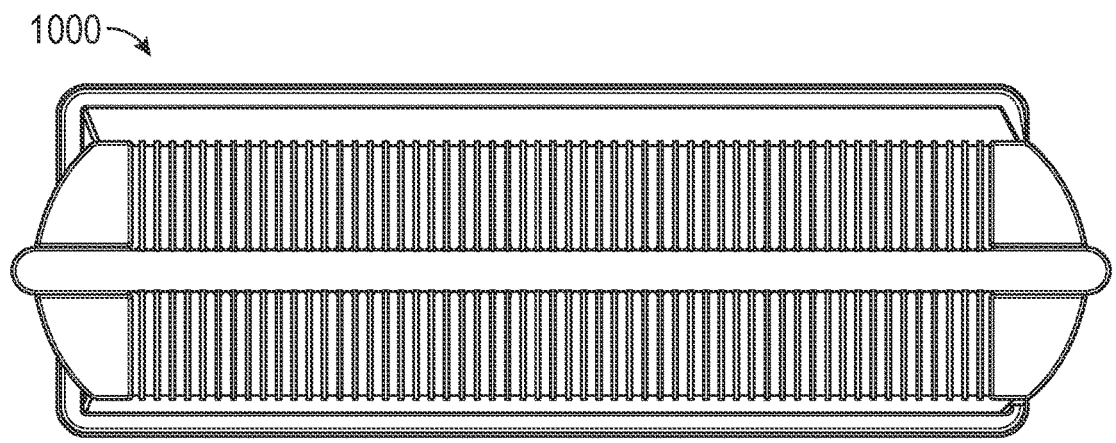

Referring to FIGS. 10 through 12, a cleanable air filter 1000 is shown according to an exemplary embodiment. The cleanable air filter 1000 is similar in both arrangement and operation to the cleanable air filter 500 discussed above with respect to FIGS. 5 through 9. The main difference between air filter 1000 and air filter 500 is that cleaning air in air filter 1000 is routed into the pleats of filter media, whereas the cleaning air of filter 500 is routed to the dirty side surface of the filter media 504. Additionally, as shown in FIG. 12, air filter 1000 includes a manifold 1002 which connects with a pressurized air input 1004 of a housing 1006. The manifold 1002 may be removably connected to the pressurized air input 1004. The housing 1006 may include a locator feature 1008 to assist a user in connecting the manifold 1002 to the pressurized air input 1004. The locator feature 1008 may include an o-ring to ensure an air tight seal between the manifold 1002 and the pressurized air input. As mentioned above, the connection shown in FIG. 12 may also be used with air filter 500.

Figure 13:
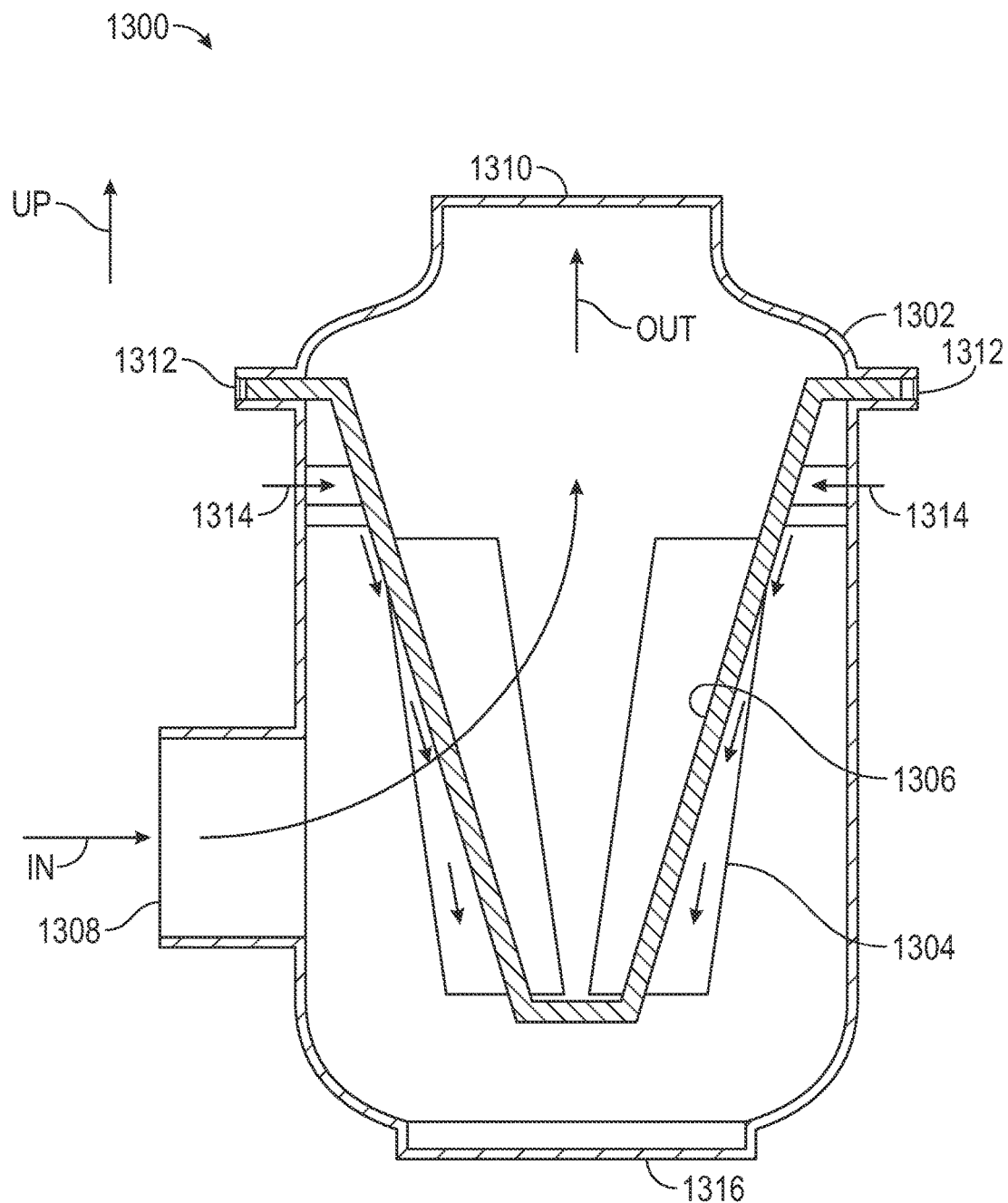
FIG. 13 is a cross-sectional view of a cleanable air filter according to an exemplary embodiment.

Referring to FIG. 13, a cross-sectional view of a cleanable air filter 1300 is shown according to another exemplary embodiment. The air filter 1300 is similar in both arrangement and operation to air filters 100, 200, 300, 400, 500, and 1000. The air filter 1300 includes a housing 1302 which houses filter media 1304. The filter media 1304 may include panelettes. In an alternative arrangement, the filter media 1304 may be arranged in a cone, may be coiled (e.g., as in air filter 400), or may be cylindrical in shape (e.g., as in air filter 100). The filter media 1304 is supported by a frame 1306 within the housing 1302. The frame 1306 may form a seal with the housing 1302 to isolate a dirty side of the filter media 1304 from a clean side of the filter media 1304. The housing 1302 includes a dirty air inlet 1308 and a clean air outlet 1310.

The cleaning system of filter 1300 includes at least one pressurized air inlet 1312 which supplies cleaning air 1314 to the air filter media 1304. The cleaning air may be configured to free captured particulate within and on the dirty side surface of the air filter media 1304 in accordance with any of the above discussed cleaning air routing systems. Unlike air filters 100, 200, 300, 400, 500, and 1000, air filter 1300 does not include an ejection port. Air filter 1300 includes a removable cover 1316. The removable cover 1316 may be shaped like a cup or a bucket. Accordingly, the removable cover 1316 may collect particulate that has been freed from the filter media 1304 by the cleaning system. The removable cover may then be removed by a user (e.g., by unscrewing the removable cover 1316, by unlatching a lock holding the removable cover 1316 in place, or otherwise separating the removable cover 1316 from the housing) in order to remove the collected particulate from the air filter 1300.

Figure 14:
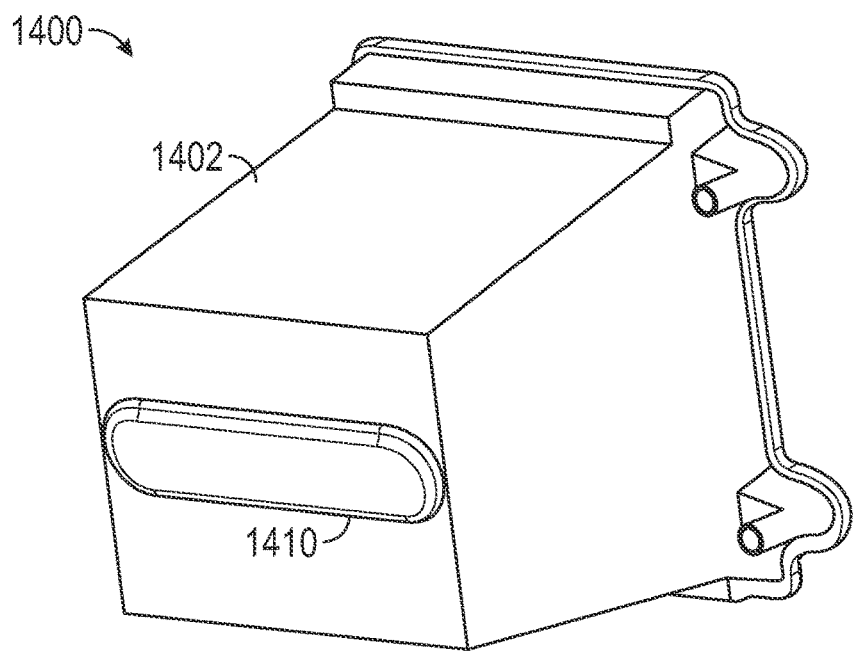
FIGS. 14 and 15 show a cleanable air filter according to an exemplary embodiment.
Figure 15:
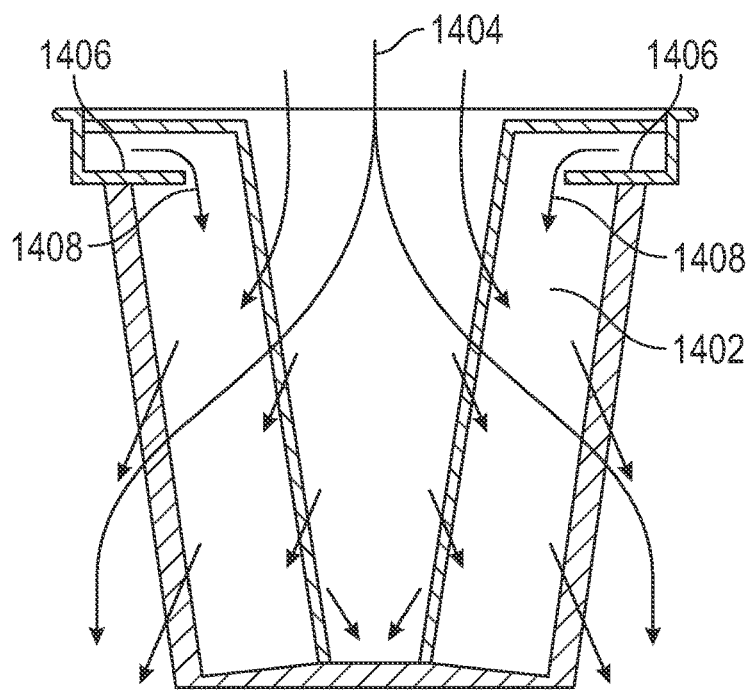

Referring to FIGS. 14 and 15, a cleanable air filter 1400 is shown according to still another exemplary embodiment. The cleanable air filter 1400 comprises a bag-style air filter system. Air filter 1400 is similar in both arrangement and operation to air filters 100, 200, 300, 400, 500, 1000, and 1300. Air filter 1400 includes pleated filter media 1402. As shown in FIG. 15, an air flow path 1404 carries air through the filter media 1402 to be cleaned. The air filter 1400 includes a manifold 1406 configured to route pressurized cleaning air 1408 onto the dirty side pleats of the air filter media 1402. The pressurized cleaning air frees captured particulate within and on the dirty side surface of the air filter media 1402 in accordance with any of the above discussed cleaning air routing systems. The freed particulate falls to the bottom of the air filter 1400, where it is collected and removed through an ejection port 1410. A vacuum source (e.g., a vacuum chamber, a vacuum pump, etc.) may be connected to the ejection port 1410 to assist in removing the freed particulate from the air filter 1410.

Figure 16:
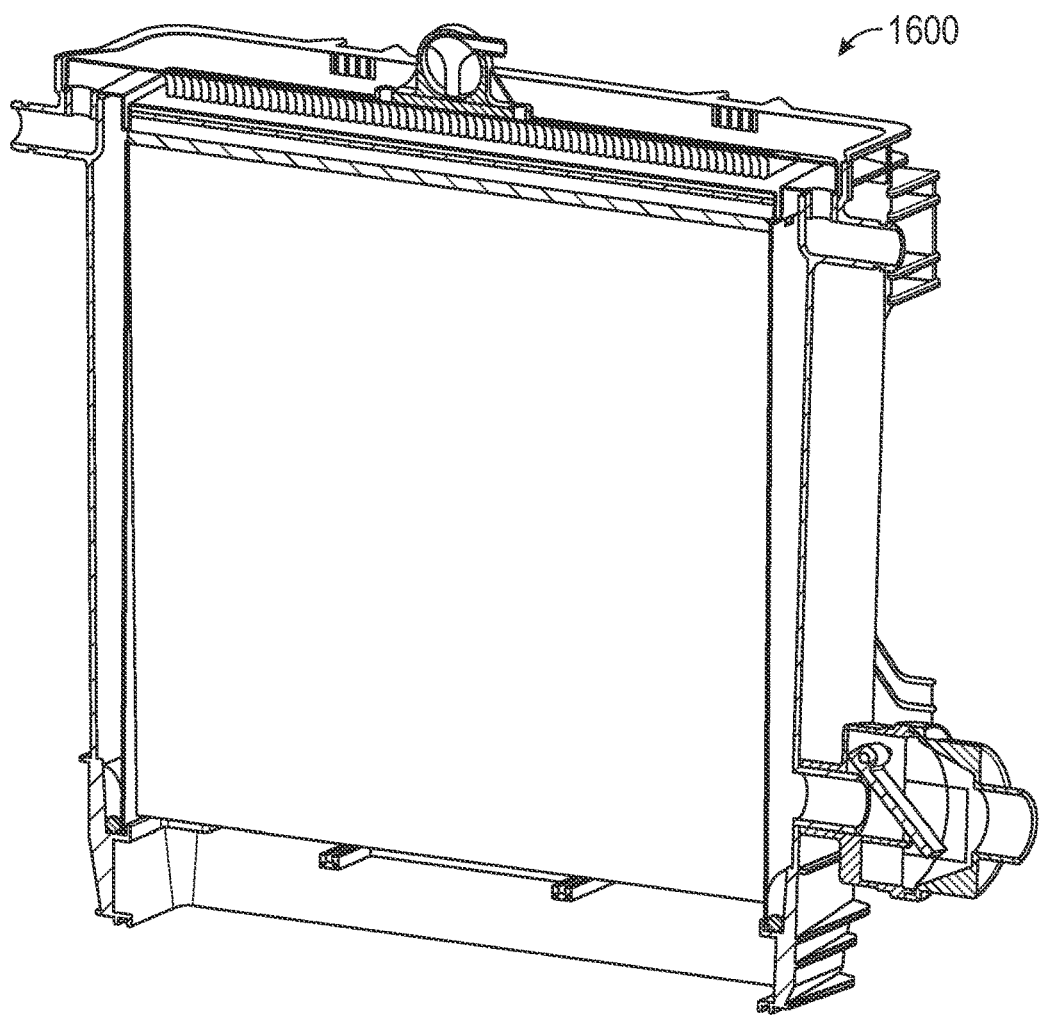
FIG. 16 is a cross-sectional view of a vibration mechanism according to an exemplary embodiment.
Figure 17:
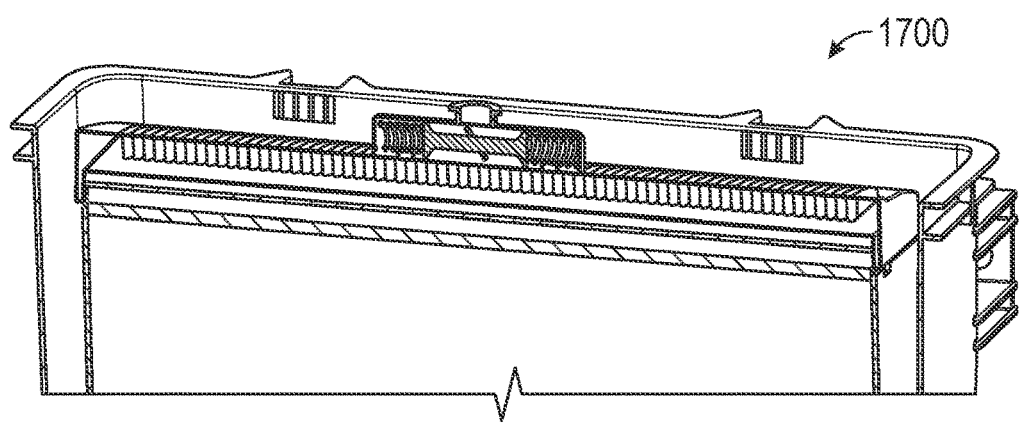
FIG. 17 is a cross-sectional view of a vibration mechanism according to an exemplary embodiment.

Referring to FIG. 16 a vibration mechanism 1600 for a cleanable air filter is shown, where the vibration mechanism 1600 includes a rotary vibrator. The rotary vibrator may include a motor having an offset weight. Accordingly, when the motor turns, the offset weight causes the vibration mechanism to vibrate. Referring to FIG. 17, a vibration mechanism 1700 including a linear or oscillating vibrator is shown. The vibration mechanism 1700 oscillates a mass linearly, which causes the vibration mechanism 1700 to vibrate. The above described vibration mechanisms 1600 and 1700 may be coupled to an air filter. The vibration mechanisms may be coupled to an air filter frame, directly to air filter media, or to a cleaning system component (e.g., an air delivery manifold). The vibration mechanisms are configured to shake the air filter media thereby assisting in dislodging captured particulate in the filter media. The above described vibration mechanisms 1600 and 1700 may be used with any of the above described cleanable air filters 100, 200, 300, 400, 500, 1000, 1300, and 1400. In alternative arrangements, the vibration mechanisms 1600 and 1700 may be used on air filter systems that do not use a pressurized fluid (e.g., pressurized air) cleaning system. Each of the above vibration mechanisms 1600 and 1700 may be driven by the cleaning air passed through the manifold or by a separate electric actuator (e.g., an electric motor).

Figure 18:
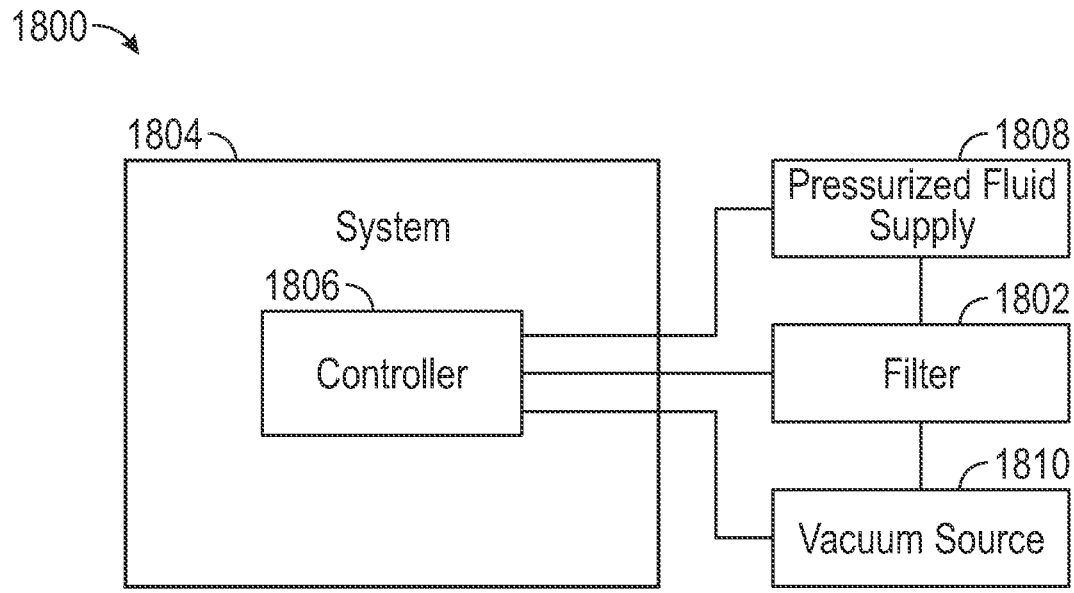
FIG. 18 is a block diagram of a system according to an exemplary embodiment.

Referring to FIG. 18, a block diagram of a system 1800 is shown according to an exemplary embodiment. System 1800 includes a filter 1802. The filter 1802 may be any of the above described cleanable air filters 100, 200, 300, 400, 500, 1000, 1300, and 1400. The filter 1802 may include a vibration mechanism (e.g., vibration mechanism 1600 or 1700). The filter 1802 filters a fluid (e.g., air, fuel, etc.) and provides clean fluid to a system 1804. System 1804 may be an internal combustion engine system, a compressor system, a medical system, an HVAC system, or the like. System 1804 uses clean air provided by the filter 1802. The system may include a controller 1806. The controller 1806 may control the operation of the system 1804. For example, if the system 1804 is an internal combustion engine system of an automobile, the controller 1806 may be the automobile's engine control module. In other arrangements, the controller 1806 may control the cleaning operations of filter 1802.

The system 1800 may include a pressurized fluid supply 1808. The pressurized fluid supply 1808 may provide pressurized cleaning fluid (e.g., air or water) to the filter 1802 during filter cleaning operations. The pressurized fluid supply 1808 may be controlled by the controller 1806. The pressurized fluid supply may provide cleaning fluid to the air filter in any manner described herein. The system 1800 may also include a vacuum source 1810. The vacuum source 1810 may provide a vacuum to an ejection port of the filter 1802 to assist with removing freed particulate from the filter 1802. The vacuum source 1810 may be controlled by the controller 1806. If the filter 1802 includes a vibration mechanism, the controller 1806 may also control the operation of the vibration mechanism during cleaning operations. The controller 1806 may automatically instruct cleaning operations for the filter 1802 based on stored cleaning settings (e.g., a periodic cleaning schedule, based on feedback from a sensor associated with the filter 1802, etc.). Alternatively, the controller 1806 may instruct cleaning operations for the filter 1802 based on a user cleaning request (e.g., a technician may provide input to the controller 1806 through an input device to instruct a filter cleaning operation to be performed on the filter 1802 while servicing the system 1804).

Figure 19:
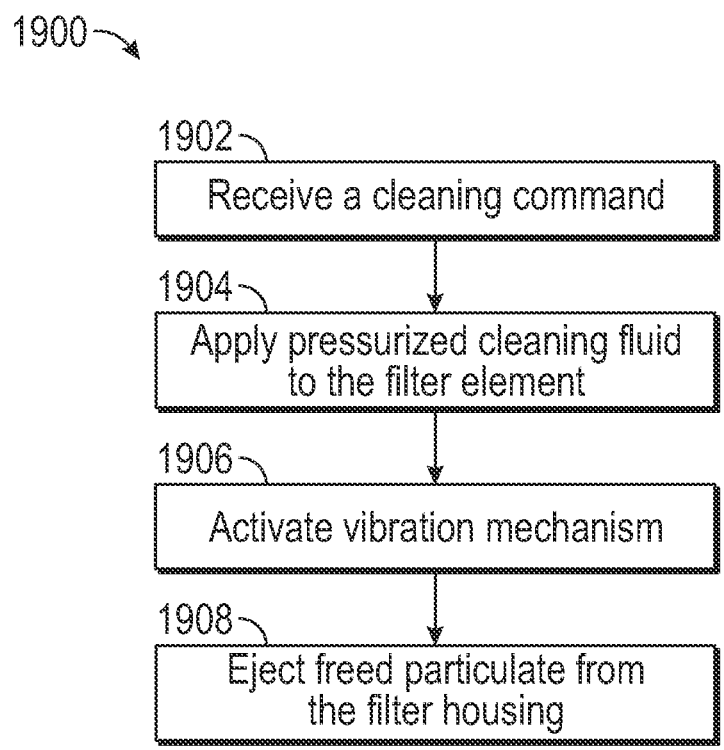
FIG. 19 is a flow diagram of a method of cleaning a cleanable air filter according to an exemplary embodiment.

Referring to FIG. 19, a flow diagram of a method 1900 of cleaning a cleanable air filter is shown according to an exemplary embodiment. The filter may be any of the above described cleanable air filters. The filter includes a filter element. The filter element may be in an installed condition within a filter housing. The filter element may include filter media. The filter may be configured to provide clean air to an external system (e.g., an internal combustion engine system, a compressor system, a medical system, an HVAC system, system 1804, or the like). The system may include a controller that controls a cleaning operation performed on the filter. In an alternative arrangement, the filter may include a controller configured to control the cleaning operation.

Method 1900 begins when the controller receives a cleaning command (1902). The cleaning command may be received automatically. For example, the controller may be configured to automatically instruct a cleaning operation on the filter after a set time interval (e.g., every day, every week, every month, every 6 months, etc.), after a set usage interval (e.g., after the filter has filtered a certain amount of air, after the system has been used for a certain amount of time, if the system is a car—after the car has been driven a certain distance, etc.), or based on a feedback signal from a sensor of the filter (e.g., an air flow sensor, an air quality sensor, etc.). Additionally or alternatively, the cleaning command may be received from an external source. The external source may be an external computing system. The external source may be a user input in which a user (e.g., a technician) may instruct an on-demand cleaning operation.

After receiving the cleaning command, the controller may instruct a pressurized fluid source to provide a pressurized cleaning fluid to the filter element of the air filter (1904). The pressurized cleaning fluid may be air, water, detergent, degreaser, or a combination thereof. The pressurized cleaning fluid may be provided to the clean side of the filter element, the dirty side of the filter element, directly to the filter element, or a combination thereof. The filter media of the filter element may include channels to distribute the cleaning fluid within the filter media. The channels may be formed within the filter media itself or in a cleaning fluid distribution manifold coupled to the media. The channels may be formed by a water-gas assisted injection molding process. The cleaning fluid may be applied in pulses or applied in a steady stream. The cleaning fluid may be applied to the filter element while the filter element is in the installed position within the filter housing. The cleaning fluid may be applied to the filter element during a filtering operation (e.g., while the filter element is providing clean air to the external system) or when a filtering operation is not being performed by the filter. The cleaning fluid may remove trapped and caked on particulate from the filter media.

The controller may activate a vibration mechanism of the filter (e.g., vibration mechanism 1600 or 1700) (1906). Although shown as occurring after step 1904, the controller may activate the vibration mechanism before or simultaneous to the application of cleaning fluid to the filter element. The vibration mechanism may vibrate the filter element in order to assist in freeing captured and caked on particulate from the filter media. The vibration mechanism may be actuated by the flow of cleaning fluid or may be actuated by an electric actuator (e.g., an electric motor).

The controller may then remove freed particulate from the filter housing (1908). The controller may instruct the opening of a valve in an ejection port of the filter to allow the freed particulate to exit the filter housing. In some arrangements, the controller may activate a vacuum source to assist in the removal of the freed particulate out of the ejection port. In an alternative arrangement, a user may manually remove the freed particulate from the filter housing.

As noted above, each of the above cleanable air filters 100, 200, 300, 400, 500, 1000, 1300, and 1400, include filter media. The above described filter media may include paper filter media, foam filter media, cotton filter media, or other suitable filter media. The filter media may include nanofiber media. The filter media may include integrated air passage channels that distribute cleaning air within the filter media. The air passage channels may be formed through a water-gas assist injection molding process. The filter media may be coated in a chemical and/or may be electrically charged.

In each of the above cleanable air filters 100, 200, 300, 400, 500, 1000, 1300, and 1400. pressurized air is described as the cleaning fluid. The pressurized air may be pulsed through the cleanable filters during cleaning operations or may flow in a substantially steady stream. The pressurized air may include a detergent configured to assist in cleaning the filter media. The detergent may include a degreaser. In other arrangements, the filters may be configured to be cleaned with a different fluid, such as water. The water may be pressurized. The water may be pulsed through the cleanable filters during cleaning operations or may flow in a substantially steady stream. The water may include a detergent configured to assist in cleaning the filter media. The detergent may include a degreaser.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A method for cleaning an air filter element having an installed condition in a filter housing and filtering fluid in a given application, the method comprising:
    conducting a filtering operation for filtering an operating fluid with the air filter element, the filtering operation comprising:
        applying unfiltered operating fluid to a dirty side of the air filter element such that clean filtered operating fluid is delivered from a clean side of the air filter element; and
    conducting a cleaning operation while the filtering operation is being conducted, the cleaning operation comprising:
        applying, by a controller, pressurized cleaning air to clean the air filter element while the air filter element is in the installed condition in the filter housing, wherein the pressurized cleaning air frees particulate from the air filter element;
        ejecting, by the controller, the freed particulate from the filter housing through a pressurized cleaning air and contaminant outlet at a discharge port; and
        applying vacuum to the discharge port to provide vacuum assist evacuation,
    wherein the pressurized cleaning air is applied to the air filter element during the filtering operation,
    the air filter element includes a primary seal seals the air filter element to the filter housing to isolate the clean side from the dirty side, the method further comprising providing the air filter element with a manifold receiving the pressurized cleaning air and applying the pressurized cleaning air to the air filter element,
    the pressurized cleaning air being applied from the manifold to the dirty side.

2. The method according to claim 1, further comprising applying the pressurized air from the manifold to the clean side.

3. The method according to claim 1, further comprising:
    applying the pressurized air to the dirty side and to the clean side,
    providing one-way flow through the manifold permitting fluid flow from the clean side to the dirty side, and
    blocking reverse fluid flow from the dirty side to the clean side.

4. The method according to claim 1, wherein the manifold includes a plurality of passage channels directing the pressurized air to locations along the air filter element.

5. The method according to claim 1, further comprising activating, by the controller, a vibration mechanism configured to vibrate the air filter element, wherein the vibration mechanism aids in dislodging of the particulate from the air filter element.

6. The method according to claim 5, further wherein the vibration mechanism is selected from the group including at least an oscillating mechanism, a reciprocating mechanism, and a rotating mechanism.

7. The method according to claim 1, wherein the given application is selected from the group including at least internal combustion engine systems, compressor systems, and HVAC systems, and wherein the applying the pressurized air is performed during a given cleaning cycle in-situ in the installed condition in the system without removing the air filter element from the system.

8. The method according to claim 7, further comprising performing the cleaning cycle automatically.

9. The method according to claim 7, further comprising performing the cleaning cycle based on a command received from a user.

10. The method according to claim 7, further comprising performing the cleaning cycle while the system is operating.

11. The method according to claim 7, further comprising performing the cleaning cycle while the system is not operating.

12. The method according to claim 1, wherein the given application is an internal combustion engine, and comprising cleaning the air filter element in a given cleaning cycle in-situ in the installed condition on the engine without removing the air filter element from the engine.

13. The method according to claim 1, wherein the air filter element is configured to filter an operating fluid, wherein the operating fluid is air.

14. The method according to claim 1, wherein the pressurized air is pulsed air.

15. The method according to claim 1, wherein the pressurized air is applied through a plurality of openings to clean the air filter element.

16. The method according to claim 15, wherein the plurality of openings are substantially evenly spaced across an air distributor.

* * * * *